(12) United States Patent
Rapport

(10) Patent No.: US 9,377,991 B1
(45) Date of Patent: Jun. 28, 2016

(54) SYSTEM FOR APPLYING PRIVACY SETTINGS IN CONNECTION WITH CREATING, STORING, DISTRIBUTING, AND EDITING MIXED-MEDIA COLLECTIONS

(75) Inventor: Sebastian Rapport, Portland, OR (US)

(73) Assignee: NORTHWEST ANALYTICS, INC., Portland, OR (US)

( * ) Notice: Subject to any disclaimer, the term of this patent is extended or adjusted under 35 U.S.C. 154(b) by 1247 days.

(21) Appl. No.: 12/705,347

(22) Filed: Feb. 12, 2010

Related U.S. Application Data

(60) Provisional application No. 61/152,628, filed on Feb. 13, 2009.

(51) Int. Cl.
*G06F 3/14* (2006.01)
*G06F 3/16* (2006.01)
*G10L 21/14* (2013.01)

(52) U.S. Cl.
CPC ............... *G06F 3/165* (2013.01); *G10L 21/14* (2013.01)

(58) Field of Classification Search
CPC ..................................... G06F 3/14; G06F 3/17

USPC .......... 715/200–277, 700–867; 700/701–866; 709/201–229; 705/50–79; 345/30–111, 345/619; 348/206–231.9; 707/200–206; 382/162, 305; 463/31

See application file for complete search history.

(56) References Cited

U.S. PATENT DOCUMENTS

| | | | |
|---|---|---|---|
| 7,672,543 B2 * | 3/2010 | Hull et al. ..................... | 382/305 |
| 7,970,206 B2 * | 6/2011 | Harris et al. .................. | 382/162 |
| 8,012,017 B2 * | 9/2011 | York et al. ..................... | 463/31 |
| 2003/0107584 A1 * | 6/2003 | Clapper ....................... | 345/619 |

* cited by examiner

*Primary Examiner* — Ruay Ho
(74) *Attorney, Agent, or Firm* — Marger Johnson

(57) ABSTRACT

A system for managing collections having multiple content types can include a screen data capture module to capture screen data in a window having a window privacy setting presented to a user on a display device, a mixed-media collection (MMC) managing module configured to manage an MMC incorporating the captured screen data, and an MMC storage module configured to store the MMC. The MMC managing module can alter the captured screen data based on the window privacy setting.

25 Claims, 14 Drawing Sheets

SYSTEM FOR APPLYING PRIVACY SETTINGS IN CONNECTION WITH CREATING, STORING, DISTRIBUTING, AND EDITING MIXED-MEDIA COLLECTIONS

CROSS-REFERENCE TO RELATED APPLICATIONS

This application claims the benefit of U.S. Provisional Patent Application Ser. No. 61/152,628, titled "SYSTEM FOR CREATING, STORING, DISTRIBUTING, AND EDITING MIXED-MEDIA COLLECTIONS" and filed on Feb. 13, 2009, which is hereby fully incorporated by reference herein.

This application is related to U.S. patent application Ser. No. 12/705,314, titled "SYSTEM FOR CREATING, STORING, DISTRIBUTING, AND EDITING MIXED-MEDIA COLLECTIONS" filed on Feb. 12, 2010, and to U.S. patent application Ser. No. 12/705,373, titled "SYSTEM FOR CREATING, STORING, DISTRIBUTING, AND EDITING MIXED-MEDIA COLLECTIONS USING DIFFERENT RECORDING PARAMETERS" filed on Feb. 12, 2010, and to U.S. patent application Ser. No. 12/705,390, titled "SYSTEM FOR CREATING, STORING, DISTRIBUTING, AND EDITING MIXED-MEDIA COLLECTIONS USING DIFFERENT PLAYBACK TECHNIQUES" filed on Feb. 12, 2010, and to U.S. patent application Ser. No. 12/705,410, titled "SYSTEM FOR CREATING, STORING, DISTRIBUTING, AND EDITING MIXED-MEDIA COLLECTIONS USING GLYPHS" filed on Feb. 12, 2010, and to U.S. patent application Ser. No. 12/705,422, titled "SYSTEM FOR CREATING, STORING, DISTRIBUTING, AND EDITING MIXED-MEDIA COLLECTIONS USING RIDERS" filed on Feb. 12, 2010, all of which are commonly assigned with this application and are hereby fully incorporated by reference herein.

BACKGROUND

Business tools such as voice-mail, email, spreadsheets, image-based rich documents, and even video have superseded historic business communication methods such as posted mail and telephone conferences as the preferred tools for transacting business. Even these modern tools, however, have their problems in that they are static, single-media, "unimodal," and cannot quickly convey complex information in a way that today's business environment demands. Online meeting resources impose time constraints that are difficult to coordinate across schedules and time zones, and online collaboration systems are disjointed from natural workflow. Shrinking development cycle times, non-uniform work schedules, and time-zone-dispersed teams can no longer be held up waiting for meeting schedules to coalesce. Emerging communication mechanisms such as instant messaging, social networking, blogging, micro-blogging, and forum discussions can be esoteric, lack clear business application, and may be dismissed as time-wasting distractions rather than effective business tools.

Relaying important information to colleagues and clients who are not immediately accessible is increasingly difficult as the world changes and communication remains constrained by the aging technologies described above. Relational information, graphical processes, and streaming video feeds have become commonplace and cannot be adequately described without extreme effort and time investment.

Embodiments of the invention address these and other limitations in the prior art.

DETAILED DESCRIPTION OF THE EMBODIMENTS

Figure 1:
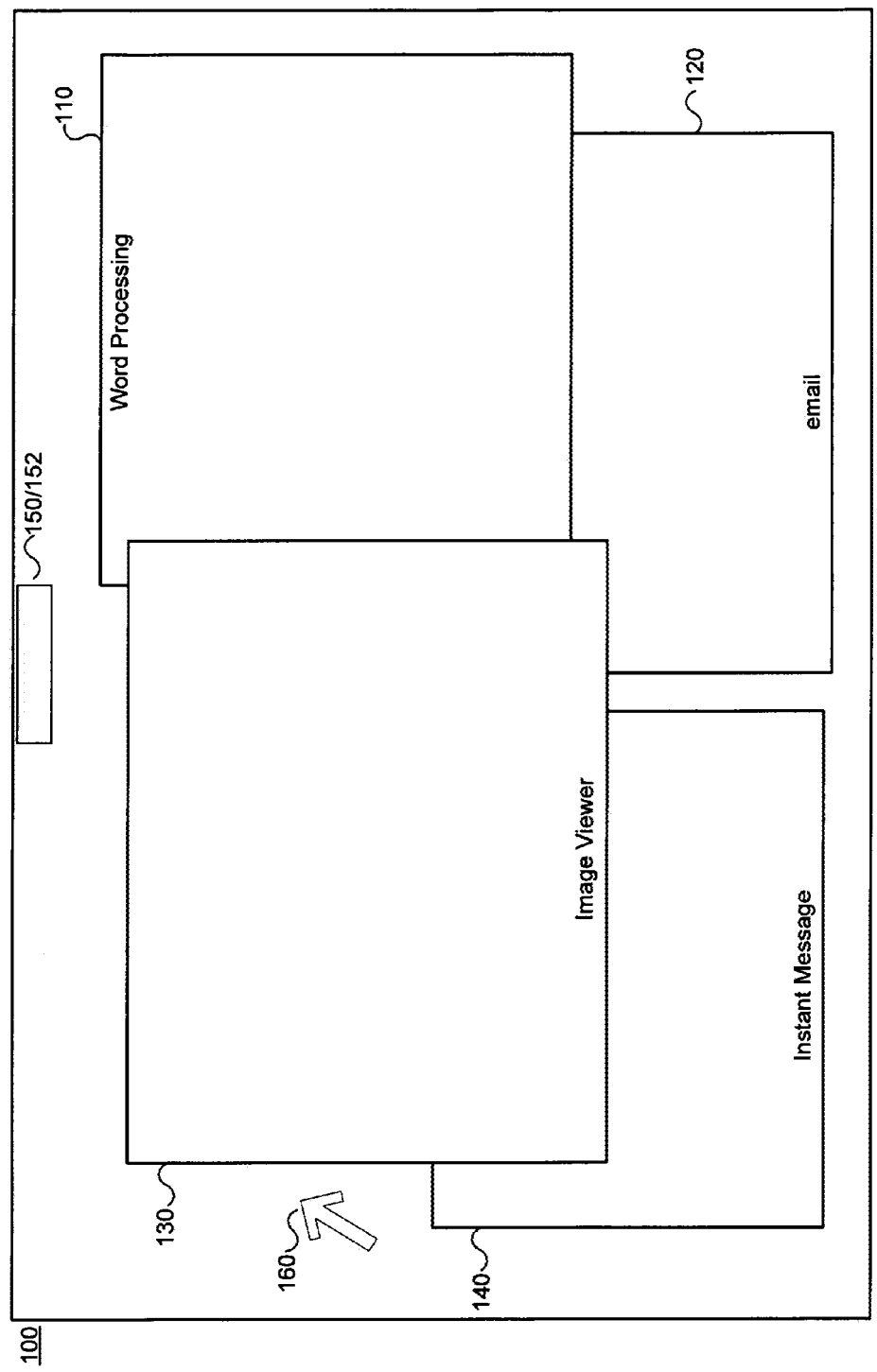
FIG. 1 is a screen diagram showing multiple example windows and a mixed-media collection creator in an inactive mode according to embodiments of the invention.

FIG. 1 illustrates a user screen 100 that includes multiple display windows or panes of various programs operating on a computer or mobile device (not illustrated). Included in the screen 100, for example, are a word processing program window 110, an email window 120, an image viewer window 130, and an instant message window 140. Each of these windows operates normally, displaying information to the user as is known in the art.

Also running on the computer coupled to the user screen 100 is a mixed-media collection creator 150. The mixed-media collection creator may be referred to as a mixed-media collection creation module in certain embodiments and as a mixed-media managing module in other embodiments. The collection creator 150 may open various windows, if at all, at different times, depending on the operating mode of the collection creator. The collection creator 150 illustrated in FIG. 1 is operating in a stand-by mode, and therefore generates a stand-by window 152 on the user screen 100. The stand-by window 152 takes up minimal space on the user screen 100, but, preferably, is always visible to the user by being always on "top," meaning that the stand-by window will cover other windows that may otherwise overlap. The stand-by window 152 may be "permanently" attached to a particular portion of the screen 100, such as the top-center as illustrated in FIG. 1, or its location could be user-selected.

Figure 2:
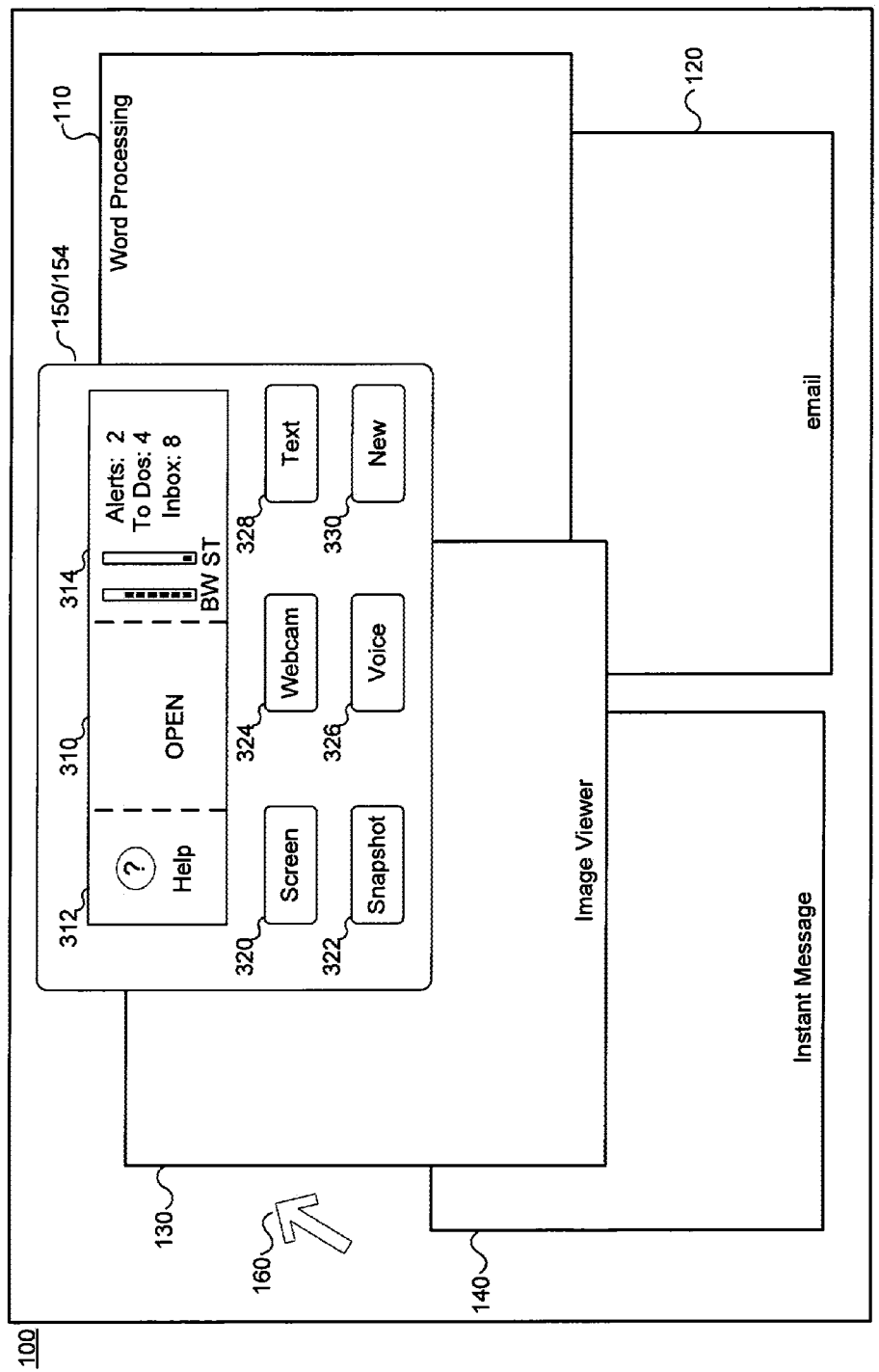
FIG. 2 is a screen diagram showing the mixed-media collection creator in an active mode according to embodiments of the invention.

The user changes the collection creator 150 from the stand-by mode to an active mode by rolling a mouse or other selection device pointer 160 over the stand-by window 152 or by mouse clicking in the window. In other embodiments, the active mode can be selected by selecting the collection creator 150 from a start menu, mouse action, by keyboard input, or automatically based on actions of other programs, for example. In the active mode, the collection creator 150 generates an active mode window 154, generally illustrated in FIG. 2 and illustrated in more detail in FIG. 3. In some modes the collection creator 150 may never be visible to the user at all, and always operate as a background process.

Figure 3:
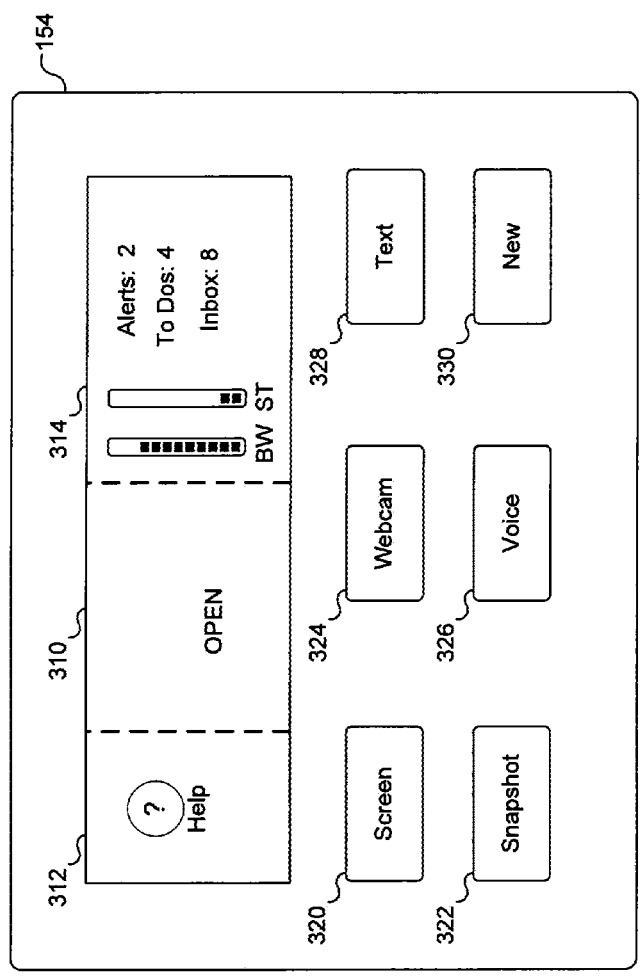
FIG. 3 is a screen diagram illustrating a detailed view of the mixed-media collection creator in the recording mode according to embodiments of the invention.

As illustrated in FIG. 3, the active mode window 154 includes several different areas or sections, some of which display information while others accept user action, and some of which can do both. A create or open section 310 starts the mixed-media collection creator, illustrated below in FIG. 8, along with the control wheel of FIG. 4. A help section 312 provides the user an ability to open a help window, and a status section 314 informs the user about messages in an inbox, along with a status of alerts, to-do items, and/or other user-selectable or configurable status modes, as described below. In some embodiments the status section includes text or graphics that displays information related to data amounts transferred, such as number of mixed-media messages sent, total size of the messages, etc.

The active mode window 154 additionally includes a set of buttons 320-330 that accept user input and cause the mixed-media collection creator 150 to initiate an action. Dependant on which of the buttons 320-330 is selected, the resulting mixed-media collection will include different components or contents that are captured using a data capture module such as a visual data capture module or a screen data capture module. Selecting the screen button 320 causes the mixed-media collection to include a record of all or a selected portion of the user screen 100; selecting the snapshot button 322 causes the mixed-media collection to include a selected image or a still image of a selected area of the screen; selecting the webcam button 324 causes the mixed-media collection to include images from a web camera (not illustrated); selecting the voice button 326 causes the mixed-media collection to include a recorded audio message; selecting the text button 328 causes the mixed-media collection to include a text file that can be scrolled through, or allow the user to enter text into a text box, along with instructions or selections as to size, format, time of image duration, behavior, and placement within the collection; and selecting the new button 330 causes the mixed-media collection to create a new mixed-media collection. In addition, the collection creator 150 may include other content types, even those that are user created. Examples of these selections are given below.

Figure 4A:
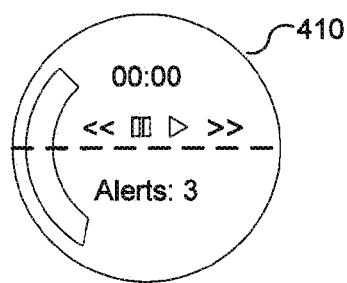
FIGS. 4A, 4B, 4C, 4D, and 4E are example diagrams of a tool wheel in various configurations depending on the current selection.

Selecting one of the buttons 320-330 may also cause the collection creator 150 to display a control wheel or tool wheel 410 on the user screen 100 illustrated in FIG. 4A, provided the tools in the wheel are appropriate for the content type being added. Each various content type may have its own specialized tool, which may or may not take the form of the tool wheel as it is illustrated in FIGS. 4A-4E. In a preferred embodiment, the tool wheel 410 floats on top of all other windows displayed on the user screen 100. The user interacts and controls the operation of the mixed-media collection creator 150 by interacting with the tool wheel 410, which includes several nested graphical menus. With reference to FIG. 4A, the tool wheel 410 is illustrated in closed form, where a timer and other controls and status information are displayed. FIG. 4B illustrates the tool wheel 410 in an open state, such as when the user selected one of the buttons 320-330 of the active mode window 154 as described above. From the open state, the user may select one of the delineated sections of the tool wheel 410 to reveal a sub-menu.

Figure 4C:
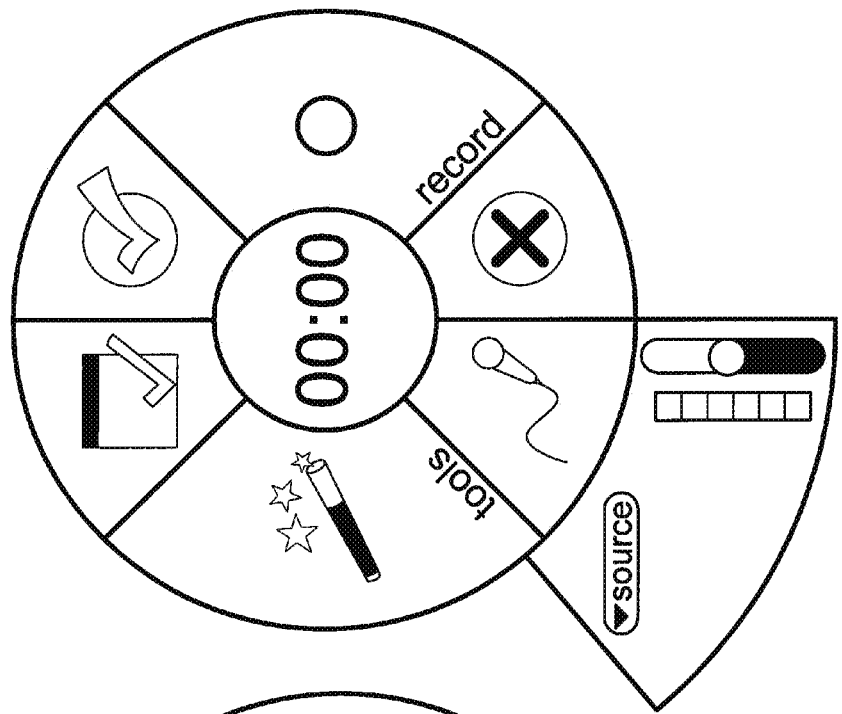
Figure 4B:
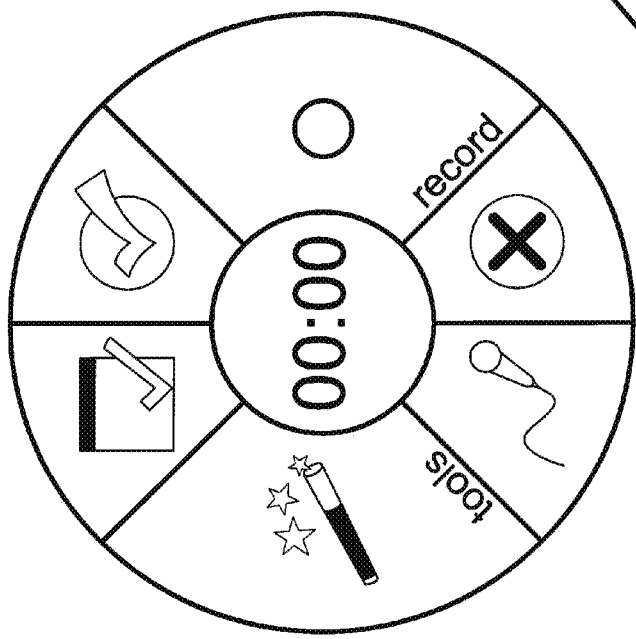

Illustrated in FIG. 4C is the tool wheel 410 having an open audio sub-menu. The audio sub-menu allows the user to select a source for the audio, as well as allowing the user to set an audio level, by using computer commands such as mouse or keyboard input.

Figure 4D:
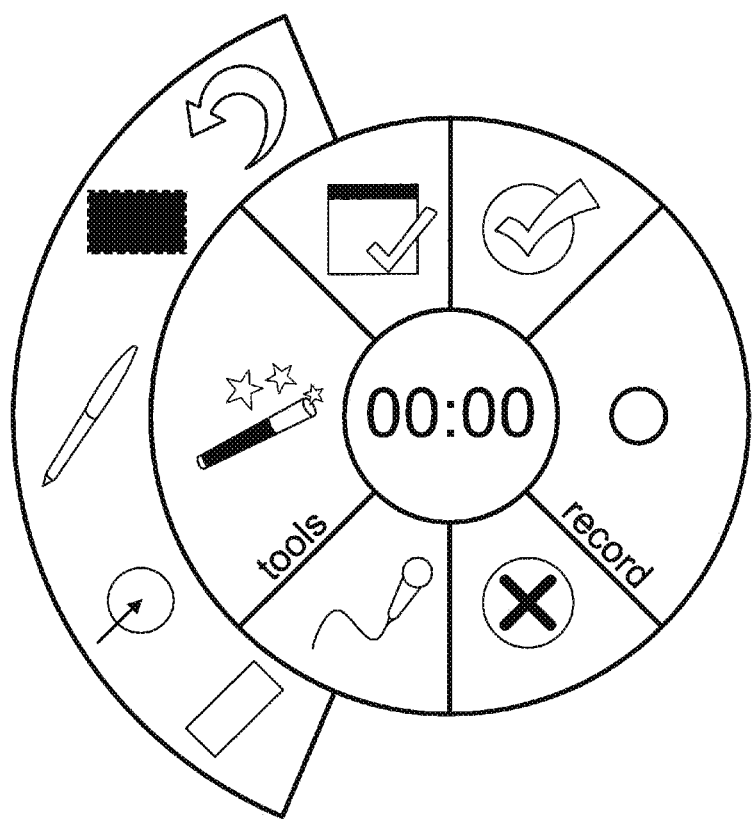

FIG. 4D illustrates the tool wheel 410 having an open tools sub-menu. The tools sub-menu allows the user to perform several actions, such as: undo the last action, create a highlighting box, initiate a selectable pointing and tracing tool (referred to herein as a pen), insert a pointing arrow, and an erase tool, by selecting the appropriate icon within the tools sub menu. In certain embodiments, data corresponding to one or more of the sub-menu items can be stored as metadata. For example, position data corresponding to the selectable pen can be stored such that, during playback, the corresponding playback pen can have a variable or even selectable appearance.

Figure 4E:
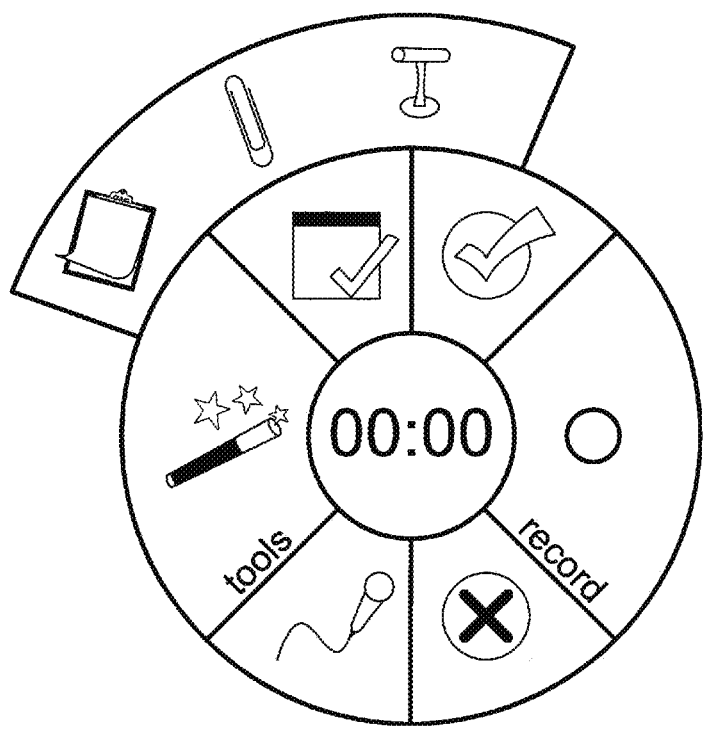

FIG. 4E illustrates the tool wheel 410 having an open switch panel sub-menu. The tools sub-menu allows the user to perform actions such as: manipulate a cut and paste clipboard, attach a file, and insert webcam images, by using appropriate computer commands. These example menus are but only some of the ways that a user can interact with the collection creator 150 to create or modify a mixed-media collection. For instance, commands could be selected from a menu, typed into a command interface, or be implemented in various other ways known by those of skill in the art, and, in some embodiments, the tool wheel 410 need not be present.

Figure 5:
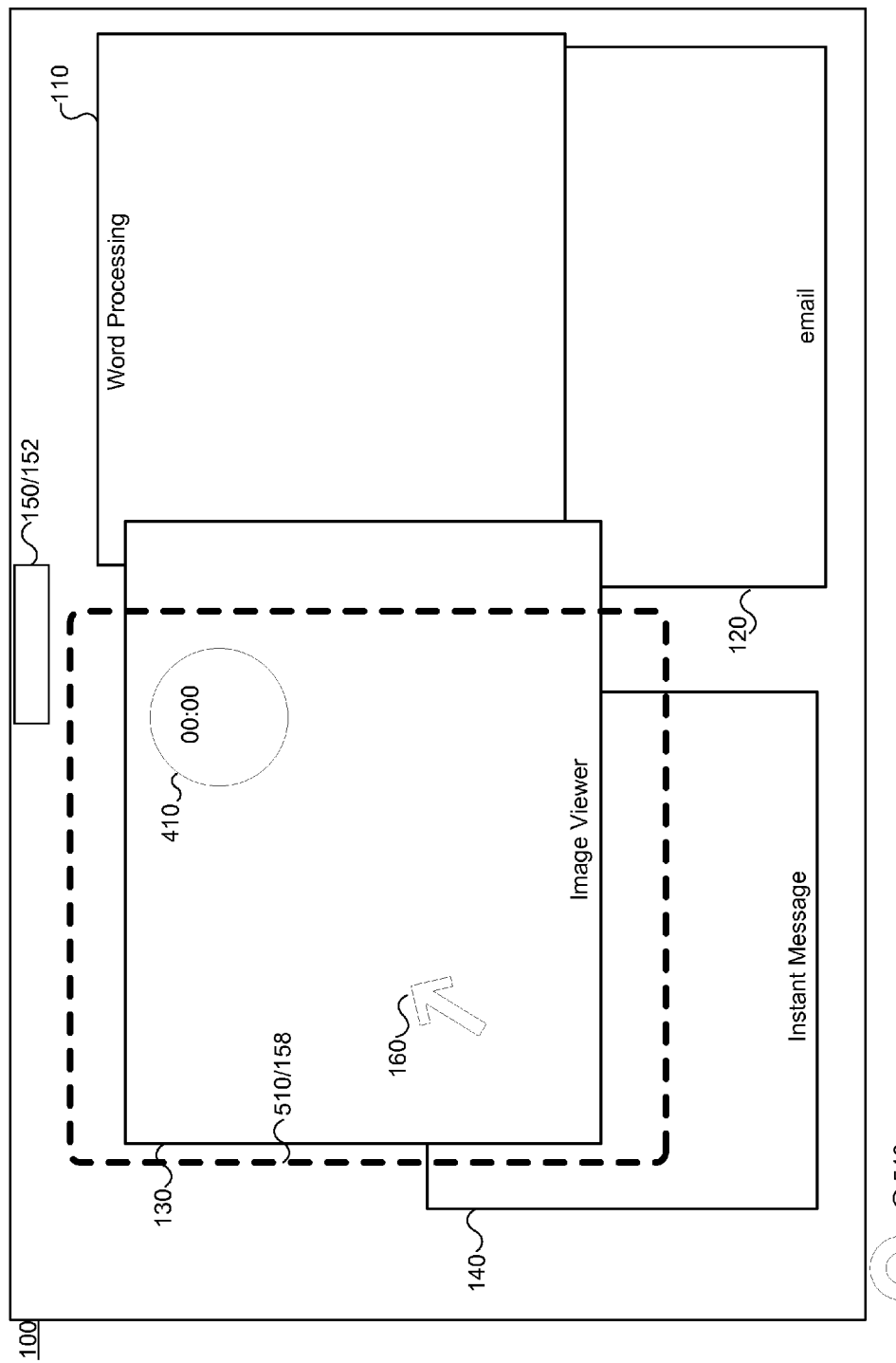
FIG. 5 is a screen diagram illustrating the mixed-media collection creator in a recording mode according to embodiments of the invention.

When the user selects the screen button 320 (FIG. 3), the mixed-media collection creator 150 displays a controllable target window 510 on the user screen 100, as illustrated in FIG. 5. In some embodiments the target window is pre-set to cover the entire screen. In other embodiments the collection creator 150 automatically selects a first complete window, or more than one window, 110, 120, 130, or 140 for capture, and indicates the selected window(s) by highlighting the window borders. The user can easily cycle through the windows open on the screen 100 to select the desired window by user action, such as by moving the mouse over a particular window to be selected. In other embodiments, the target window 510 may be manually sized by the user to cover as little or as much of the screen 100 as the user desires by using conventional mouse action. In certain embodiments, the target window 510 can be defined by a boundary obtained by essentially concatenating the non-hidden, non-overlapping boundaries of the selected windows.

In a typical usage, the target window 510 will highlight, frame, or target only a single window on the screen 100. In other usages, all of the individual windows 110, 120, 130, and 140 that are within the target window 510, which in the example illustrated in FIG. 5 includes the image view window 130 and instant message window 140, are recorded exactly as they appear on the user screen 100. Thus, in the illustrated embodiment, the image view window 130 overlaps and blocks a portion of the instant message window 140. If, instead on the user screen 100 the instant message window 140 overlaps the image view window 130, then the image recorded in the mixed-media collection would show the instant message window 140 overlapping and blocking the image viewer window 130.

In another embodiment, contents of the windows are recorded within the target window 510 independent of whether or not they are displayed on the user screen 100, but rather dependent only whether the window, or portion of the window, is within the target window 510. For example, with reference to FIG. 5, in this mode, the data capture module will record the entire portion of the window 130 that is within the target window 510 as well as the entire portion of the window 140 that is within the target window 510 as separate video portions in the same mixed-media collection generated by the collection creator 150, even though one of the windows partially covers the other on the user screen 100. This is possible because some operating systems include memory areas for the entire window, whether or not the entire window is displayed on the user screen. The mixed-media collection creator 150 accesses the memory for all of the windows and records the underlying data. During playback of the mixed-media collection, either or both of the windows 130, 140 may be displayed, or the user may choose to recreate the playback window exactly as it was recorded.

In another record mode, the data capture module records all of the windows on the user screen 100 without reference to the target window 510. In this mode, all of the windows on the screen are simultaneously recorded as separate clips, segments, or layers within the mixed-media collection. Depending on the playback mode or permissions of the user, described below, any or all of the individual windows can be viewed when the multi-media collection is replayed.

When the target window 510 is currently targeting any or all of the particular windows 120, 130, 140, or 150 on the screen, both before and after the data capture module has started recording, the targeted window or windows are still "live," meaning that the user can still interact with the window. In other words, the user can highlight, re-size, select, edit text, and perform other actions in the underlying window, even while the target window 510 is targeting such a window.

In another embodiment, selected ones of the individual windows 130, 140 that are within the target window 510 may be specifically not recorded into the media file even though they appear on the user screen 100 based on a security measure such as a window privacy setting associated with the protected windows. One reason to include such a feature is for data privacy. For instance, the user may instruct the collection creator 150 to record a viewer image, such as the window 130, but to specifically not record an instant message window, such as the window 140, by associating a corresponding window privacy setting with the instant message window. In such a case, the collection creator 150 may retrieve the pertinent window privacy setting and, responsive to the setting, blur the window 140 while creating the resulting mixed-media collection, "black out" the window 140, or simply not record anything for the restricted window 140. Note that this does not necessarily mean that the user making the recording cannot see the window 140 while the collection creator 150 is operating. Indeed, the window 140 may be completely visible on the user screen 100, but, when such security measures are taken, the window 140 will not be shown when the mixed-media collection is played back. This feature may be particularly useful in a financial context, where the collection creator 150 can be instructed to never record (or to always blur) a window that displays financial data.

In certain embodiments, a window privacy setting can be established for a particular window, such as window 140 discussed above, or for a particular window type. The window privacy setting can be established automatically, e.g., by default for certain window types, or manually. For example, a certain window privacy setting can direct the collection creator 150 to always apply a security measure to all instant message windows. Until the corresponding window privacy setting is changed or deleted, the collection creator 150 will perform the desired action. A window privacy setting can be used to direct the collection creator 150 or other applicable module, e.g., a mixed-media collection playback module, to perform the desired action before and/or during creation of a mixed media collection or, as discussed below, after a mixed-media collection has already been created.

In some embodiments the blurring, blacking out, or omitting the window during playback is applied at a user level. In this mode, the user preferences control, and the user completely controls which windows have controlled access. In other embodiments a local server implements preferences for multiple users. In this mode group-wide preferences control the access and display of the recorded windows. For example, a group server may automatically blur or omit any windows that show financial data, or those generated by a particular program. In other embodiments periodic scans of the image and metadata within the windows or elsewhere on the screen 100 are made, analyzed, and access controls are implemented based on the contents of the scanned windows and/or metadata. For example, a server may blur any window that includes any name that is within a given client list stored on the server or elsewhere. In a third mode, a central repository operates in the same mode as the group server as described above, but operates for the entire system served by the central repository.

In yet other embodiments, access decisions are made after the fact. In these embodiments a user, having already recorded a particular window into a mixed-media collection or having seen a collection recorded by someone else, may later decide that he or she no longer wishes the window to be available or visible during playback. In this mode a user may select a window, or group of windows, that was originally able to be viewed by others. After such a selection, the user may apply password protection, blur, or omit the particular window or group of windows. The user may invoke these security measures by associating a window privacy setting with the pertinent window(s). As above, this level of control may be applied at the group server or central repository level.

In certain embodiments, some or all of captured screen data including captured screen data to be altered, e.g., blurred, blacked out, or omitted, can be encrypted using any of a number of encrypting techniques suitable for such data. In addition, or alternatively, a password can be applied to some or all of the captured screen data. For example, certain types of data can be designated as password-protectable. A password can be associated with such data when stored as part of captured screen data so that, when played back, the system can require a password in order to display the affected data, for example.

Similar to blurring or omitting the window 140 from the mixed-media collection as described above, the control wheel or tool wheel 410 is typically not recorded in the mixed-media collection, even when the control wheel appears to the user within the target window 510, such as illustrated in FIG. 5. Instead, the collection creator 150 records the window 130 covered by the control wheel 410. When the window 510 is played back, the portion of the window 130 that is within the target window 510 appears in its entirety, without the control wheel 410 overlay.

To identify the target window 510 as a unique window, the target window has a different appearance than regular window borders, in that it may be thicker, or have a contrasting color to other window borders. The target window 510 may be sized in the typical manner for sizing windows on a computer screen 100, such as by dragging a corner to the desired position with the mouse. In some embodiments the target window 510 may be dynamically sized during recording.

After the target window 510 is positioned, the user initiates the recording action by the collection creator 150 by mouse click or button press. When in record mode, the collection creator 150 uses a data capture module to record the portion of the user screen 100 that is within the record window, subject to the blurring or omitting details directed by a window privacy setting, as discussed above. Specialized recording hardware and/or software operating in conjunction with the specialized recording hardware makes a copy of the screen data, compresses it, and stores it in a computer or other machine-readable file. In some embodiments, the software runs on a standard microprocessor. Both moving and static files may be recorded as their image on the screen 100, or as the underlying data that was rendered into the screen image. In some embodiments the process for generating or reviewing a multi-media collection is performed on a hand-held mobile device. The pixels or other data of the screen 100 that makes up the target window 510 are stored in a computer or machine-accessible file, referred to herein as a mixed-media collection 520. In addition to the data within the target window 510, the mixed-media collection 520 includes various other associated data, as described below.

In addition to the video data of the record window 158, the collection creator 150 may also associate mouse or other pointer data with the media file. In one embodiment, the collection creator 150 simply stores the mouse indicator 160 image as it appears and moves within the target window 510 during the recorded timeframe, in a similar manner to how other video information is stored, described above. In other embodiments, the collection creator 150 stores mouse movements by the data the mouse generates when it is moved by the user, such as a reference location and differential movements in the x, y, and z directions. In this system, software or hardware captures the mouse movement and click data, either from the operating system or from the mouse hardware itself. In either system the mouse pointer is re-created on playback and shown to the user. Along with the other stored data, audio data sampled from the microphone 540 or elsewhere in the system is also digitized, or already digitized audio data is recorded and saved along with the screen information as described above as data in the mixed-media collection 520. The system includes an alert to notify the user if no audio data is being input to the host computer. This prevents, for instance, a user from recording a long mixed-media collection only to find that the microphone was not plugged in or otherwise had no audio available for recording.

In some embodiments, different recording parameters can be applied to different areas of a screen presented to a user. These recording parameters can be initially set and adjusted automatically, e.g., based on a certain window or content type, or manually at the direction of a user, for example. The areas can include any of one or more portions of each of one or more windows displayed on the screen. The collection creator 150 can use these recording parameters in determining how to record the affected area(s) or window(s). For example, different windows 110, 120, 130, 140, or even different areas of the screen 100 can be recorded at varying and dynamic frame resolution, at varying frame-rates that are continuously adjusted, or at a different compression ratio than others. Also, some windows may be recorded at a higher frame rate or with less compression than others. This may be important if, for example, the multi-media collection were being created to illustrate a forgery on a painting, and the evidence could not be perceived with the standard compression, due to compression artifacts or other imprecision.

In some embodiments, a pointer capture module can be used to capture pointer position data defining the position, e.g., x-y position data, of a pointer within the screen during screen capture, for example. The pointer capture module can also record the appearance or form of the pointer during the capture period. During playback, the mouse indicator 160 may be re-created exactly as it was recorded, or it can take another appearance or form. For example, the mouse indicator, during playback, may be expressed as a blue dot, an arrow, a highlighted circle, an "x," other pointing indicator, or animated object, etc. The pointer appearance may be dynamically reconfigurable during playback. For example, the playback module can present the viewer with a number of selectable pointer types such that, responsive to a selection by the viewer, the playback module can alter the visual form of the re-created pointer accordingly.

In some embodiments, the user can assign a security level for a particular window within the mixed-media collection, or to the entire collection itself. During playback, if the user viewing the mixed-media collection has the appropriate security level, then the window is displayed, and, if the user's security level is below the specified security level, then the window is not displayed, or shown blurred, during mixed-media collection playback. Security levels may be assigned by job titles or position, for instance. In one example a real estate agent may be able to see a particular window that includes a current appraisal, but an office assistant could not see the appraisal data. In other embodiments the access may be governed by content, so that only one class of recipients can see financial data while no one else can. Management of permissions and deciding whether or when to show particular content windows is described below.

In still other embodiments, the creator or subsequent user may protect the mixed-media collection by password and/or encryption. In such embodiments the recipient or subsequent user that interacts with the mixed-media collection is prevented from seeing the full collection without supplying the proper password or encryption key. In some embodiments a portion or portions of the mixed-media collection may be password protected, or encrypted, while others are not. For instance, a user who does not supply the password may only be able to hear audio, or only see a text screen while a user who correctly supplied the password has full access to see/hear/interact with all parts of the collection.

Figure 6:
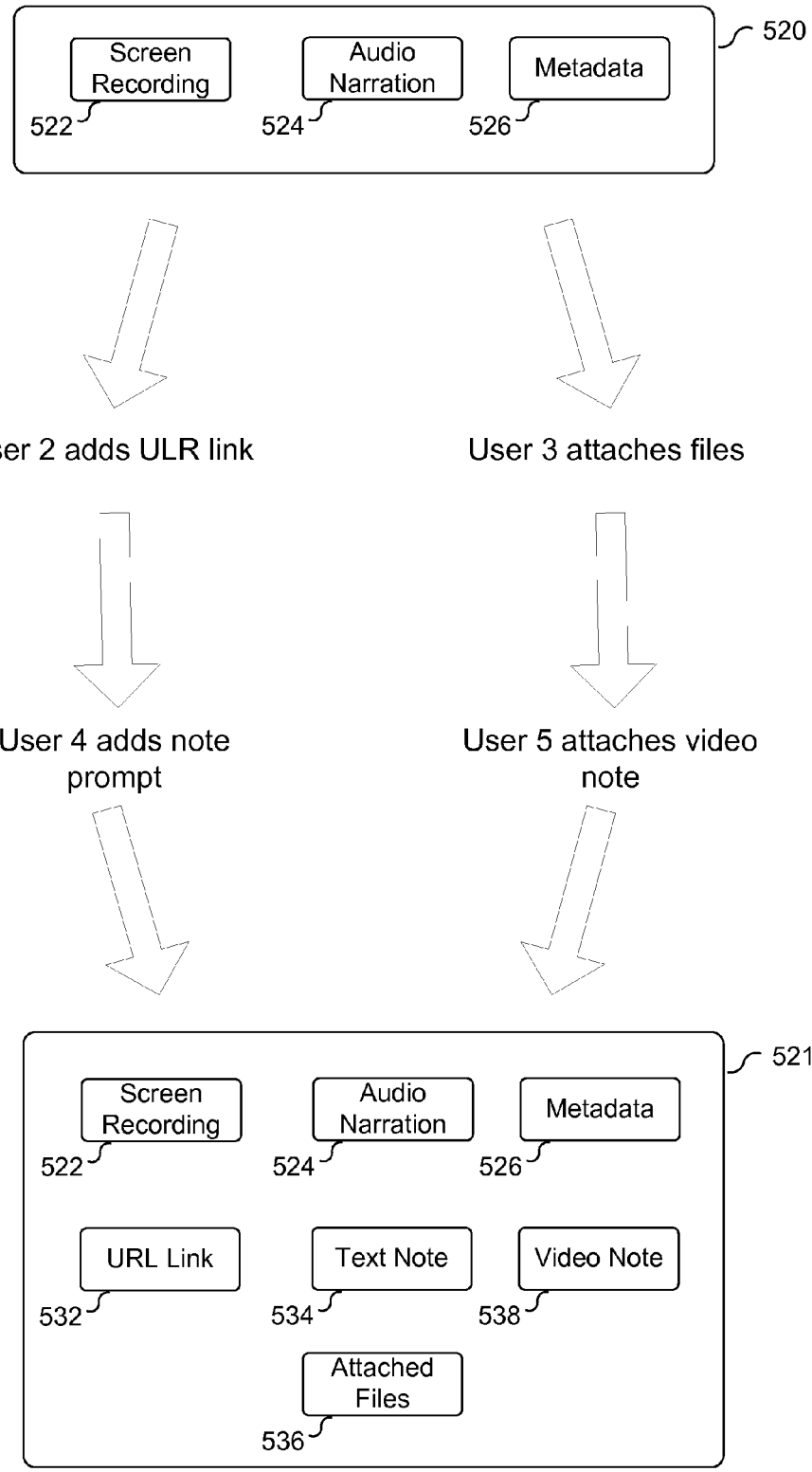
FIG. 6 is a block diagram illustrating actions that may be added to a base mixed-media collection by various users.

With reference to FIG. 6, an example mixed-media collection 520 is illustrated. The mixed-media collection 520 can be thought of as a package or container of segments or clips of one or more content types that can be stored on a computer disk or other media. The illustrated mixed-media collection 520 at the top of FIG. 6 includes a screen recording component 522, an audio narration component 524, and a metadata component or components 526, although this is but one example of a mixed-media collection. Other mixed-media collections can include multiple types of clips, such as screen recordings, video, webcam recordings, audio, scrollable static files, such as pictures documents, and other files along with data or metadata described below. Each of these components, collectively, makes the mixed-media collection.

The media file 520 may be sent to a recipient or recipients through a resource link such as a URL, to a recipient, or group of recipients. Alternatively, or in addition, the creator of the mixed-media collection can publish a locator, such as a URL, to the mixed-media collection. When sent or published, the mixed-media collection including all clips, attachments, metadata and related content is uploaded to a central repository if it already hasn't been uploaded during composition. A 'configuration' of the content creator determines if clips are cached locally or uploaded in real-time, or other time period, during composition. During upload, the mixed-media collection may be encoded or re-encoded to reduce file size. Any authorized recipient, i.e., one who received the mixed-media collection through an email or by selecting it from a publication can "interact" with the mixed-media collection. Interaction means the recipient may view, edit, add to, delete portions from, and/or otherwise collaborate with the original user or any other user of the same mixed-media collection. Other examples of interaction include adding mouse trails, mouse clicks, pointer trails or clicks, voice-over, new recorded segments of any type, highlighting with colors, making new markups with circles or other structures, or animations, etc., such as those examples provided below. Even further, a multimedia collection can specify that a particular window or region of the playback screen is filled with real-time data, such as a video stream from traffic cameras, real-time stock quotes, etc. In such an embodiment, the creator may record audio that says "here is the latest up-to-date weather information", and specify that a real-time weather feed is to be inserted at playback. During playback, the playback program is directed to access data from a particular location such as government transportation cameras, or from one of a list of acceptable locations, then insert the retrieved data into the pre-formatted display.

Still referring to FIG. 6, this diagram illustrates how various users add or modify the base mixed-media collection 520 created by a User 1 to become the modified mixed-media collection 521. In a first path, a User 2 adds a Uniform Resource Locator (URL) link, such as a web address, to the media file 520. Adding the link allows a user who later plays the media file 520 to select a link to the URL during playback. Also in the first path, a User 4, who accessed the mixed-media collection 520 or after User 2, adds a text note, which also becomes part of the modified mixed-media collection 521.

In a second path, User 3 attaches files to the media file 520, and a User 5 attaches a video note. Each of these additions, the URL link 532, text note 534, attached files 536, and video note 538 adds to the already present screen recording component 522, audio narration component 524 and metadata component 526 to become the new modified mixed-media collection 521. During playback, each subsequent user can see and access, provided the subsequent user has sufficient privileges, each of the various attached components and additions of the media collection 521, as described below.

The individual components of the media collection 520, and the collection itself may be implemented in any number of ways. In a simple embodiment, each media collection 520 is a list of the individual files that make up the mixed-media collection, such as the video, audio, and attached files. In other embodiments the list of individual files in the media collection 520 can be in the form of a linked list or database. In still other embodiments some or all of the individual files may have multiple copies stored at various locations, such as in different parts of the world, all connected by the internet. In such embodiments, when one media collection 520 is accessed, or the individual components thereof, whichever of the multiple copies is fastest or easiest to retrieve becomes the one used in the media collection 520.

If the computer attached to the user screen 100 includes a microphone 540, or other audio input, then the collection creator 150 also records audio data and stores it in the mixed-media collection 520 along with the video data of the record window 158. The audio data is preferably recorded and stored in the media file 520 in real-time, but the collection creator 150 may alternatively or additionally record the audio data and processes it, at a later time, before storing it in the media file 310.

The collection creator 150, in addition to video data and audio data, also records and stores other data in the media file 520. One example of such data is metadata 526, which, as used herein, describes various other data that may be associated with and stored in the media file 510. One such example of metadata 526 is the date and time that the media file 520 was created. Other examples of metadata include keys pressed, mouse coordinates and clicks, application name, voice to text, translated text, window locations in X, Y, and Z coordinates, and size of the recorded windows, for example. The metadata may be stored in any appropriate format, such as XML. Data may also or additionally be stored within a data stream of the mixed-media collection itself, which itself may include various databases or records within one or more databases all stored on a computer hard drive or other machine-readable media. Any data available to the host computer while the media file 520 is created or modified is eligible to be stored as metadata. Metadata may be kept in a single file associated with the mixed-media collection 520, or each separate type of metadata may be individually stored. Other embodiments of the invention may include any number of separate metadata files associated with the mixed-media collection 520.

In one particular example, the mixed-media collection 520 includes a "clipboard," which, in one embodiment, allows a creator to store particular data in a repository that can be accessed by a recipient. Such an embodiment has many practical uses. For example, the mixed-media collection 520 may be a video segment illustrating how to make a particular function in a spreadsheet program, such as EXCEL. In an example, the creator of the mixed-media collection 520 can paste computer code for a macro or other particular function in the clipboard of the collection. When the recipient opens and plays the mixed-media collection 520, the same computer code is available to the recipient, simply by copying the code from the clipboard, then inserting it into the recipients own copy of the spreadsheet. Boundless other examples exist, such as particular web searches, codes for specific software, login IDs, etc.

The original creator or subsequent user can interact with the clip in a number of ways. In addition to the ones described above, any user, having the appropriate permissions, may edit any segment or clip, such as trimming the beginning, middle or end of any clip, deleting mid-segment material, inserting new or modified clips, moving clips, copying clips, etc. Description of interacting with various clips is described in more detail below. In essence, the mixed-media collection 520 is a storyline or collection or one or more of the segments or clips, which are various media types or even custom clip types. In addition, static files may be attached to the mixed-media collection 520 as well, for use by the recipient.

Any user may also embed "actions" for subsequent users of the mixed-media collection 520. Some actions may be automatic, while others may require input from a subsequent user. An example of an automatic action is a "notify me" action, in which the central repository may send a notice to the creator or other user when the mixed-media collection 520 is viewed, or when a certain segment of the collection is viewed. Other actions may rely on recipient action. For example, in a "to do" action, the original creator of the mixed-media collection 520 inserts a "to do," which may be to a specific user or to any recipient. The recipient performs the action, such as by making a calendar appointment, or selects a "completed" box that was created in response to the "to do" action. After the recipient clicks the "completed" box, the creator is notified, such as by an email message, that the recipient has completed the task. The notification back to the creator may be automatic, such as the central server sending an email message, or may exist only in that the mixed-media collection 520 is now updated to reflect the action has been completed. The next time the creator views the modified mixed-media collection 520, the creator can see that the recipient has completed the action.

As described above, metadata is stored along with the mixed-media collection 520, as it is being created, edited, or replayed. In certain embodiments of the invention, a user may be able to interact with some or all of the stored metadata. For instance, a user may be able to search the media collection for anytime a particular series of mouse clicks is recorded or a particular tool is selected, such as a highlight tool. In such an example, a series of three mouse clicks may indicate a particular important portion of the media collection. By storing this collection of mouse clicks as metadata, the user can later search for such an indexing mark, or other indexing marks that will take them directly to those particular portions during playback of the media collection. Other metadata searches may include searching for the opening or other action of or within a particular program. For example, the user may search for a time point when a word processing program opens in a mixed-media collection. Still other metadata searches can locate when the creator or subsequent user typed "acknowledged" within a text box. Still other metadata searches may include searching for a particular word in an automatically generated machine translated text flow, or a human generated text that is later inserted that accompanies a video description. In this last example, an auto-translator operating on a host computer, server, or central repository may translate the words spoken into the microphone 540 (FIG. 5) automatically, and store the translated words as a data stream along with the mixed-media collection.

Translation can include an audio interpretation that accompanies playback, or translation text that can be included as metadata or visual text on the screen. Additional translations and interpretations can be added to the mixed-media collection over time, which are made available to the user at playback.

Further, metadata stored along with the hybrid mixed-media collections may be graphically represented during playback. In such an embodiment, a particular area of the playback window, such as the lower right hand corner, may be dedicated to this visual indication of stored data. This visual indication is termed a glyph. A glyph may also refer to a visual indication of certain data or content stored as part of a mixed-media collection. In some embodiments, the glyph may be a rectangular, square box, or any shape made up of a multitude of tiny squares where each square directly or indirectly maps to a portion of data such as captured screen data or stored metadata. For instance, digitized audio data may appear in one portion of the glyph, which would vary its visual display as the audio data was played back. In other embodiments the glyph may not appear within the viewed portions of the playback screen, but rather out of view of the user watching the playback, for example in an area above or below, or to the right or left of the displayed screen. In still other embodiments the glyph may be present, but generated as partially or fully transparent, e.g., not visible. In such embodiments, any playback data situated beneath the glyph will thus remain at least partially visible to the view. The glyph may appear static, for some or even all segments, or may be continuously updated in real-time as the mixed-media collection is played. For example, the form of the glyph may correspond to a particular content type displayed during playback or to a particular portion of the playback time interval. The glyph can be generated initially at creation of the mixed-media collection, added at a later time, or re-generated at playback using different data to generate the glyph. In some embodiments, multiple glyphs may be presented during playback, each glyph corresponding to a different set of data or a different content.

Other visual metadata shown in the glyph may indicate mouse movements, particular included files or types of files and digital counters, for example.

In one sense, the visual glyph for metadata may act as a trademark that identifies the particular type of mixed-media collection as being created using a particular software program in conjunction with hardware.

The glyph may also include portions of text, numbers, or other human readable format.

Metadata can also be used as a unique identifier to identify the source, origin, or creator of the individual segments of the mixed-media collection, and optionally embedded in the stream. In a revenue sharing situation, content can be shared, tracked, and billed, based on identified segments or frames of the portion or portions of the mixed-media collection that are included in the collection upon which the revenue was based.

After the creator creates the initial mixed-media collection 520, or after a subsequent user modifies the collection, the mixed-media collection 520 can be sent to another recipient or uploaded into the central repository.

Some embodiments of the invention may include a facility for gathering data about the mixed-media collection itself and storing it back within the collection. For example, as each mixed-media collection is viewed by more and more users, data about how the collection is viewed or interacted with can be stored. For example, if a multitude of users watched the first video clip within the mixed-media collection and then skipped through the next three video clips, a representation of such action may be tracked, collected, and stored within the collection itself. Then, the original creator, or anyone else who has such permissions, can query the collection itself to determine which portions have been watched most, and which have been skipped through. In some cases it is possible to extract particular clips from one mixed-media collection and insert it into another collection. Data may be stored about such editing which may be useful to the original creator.

Figure 7:
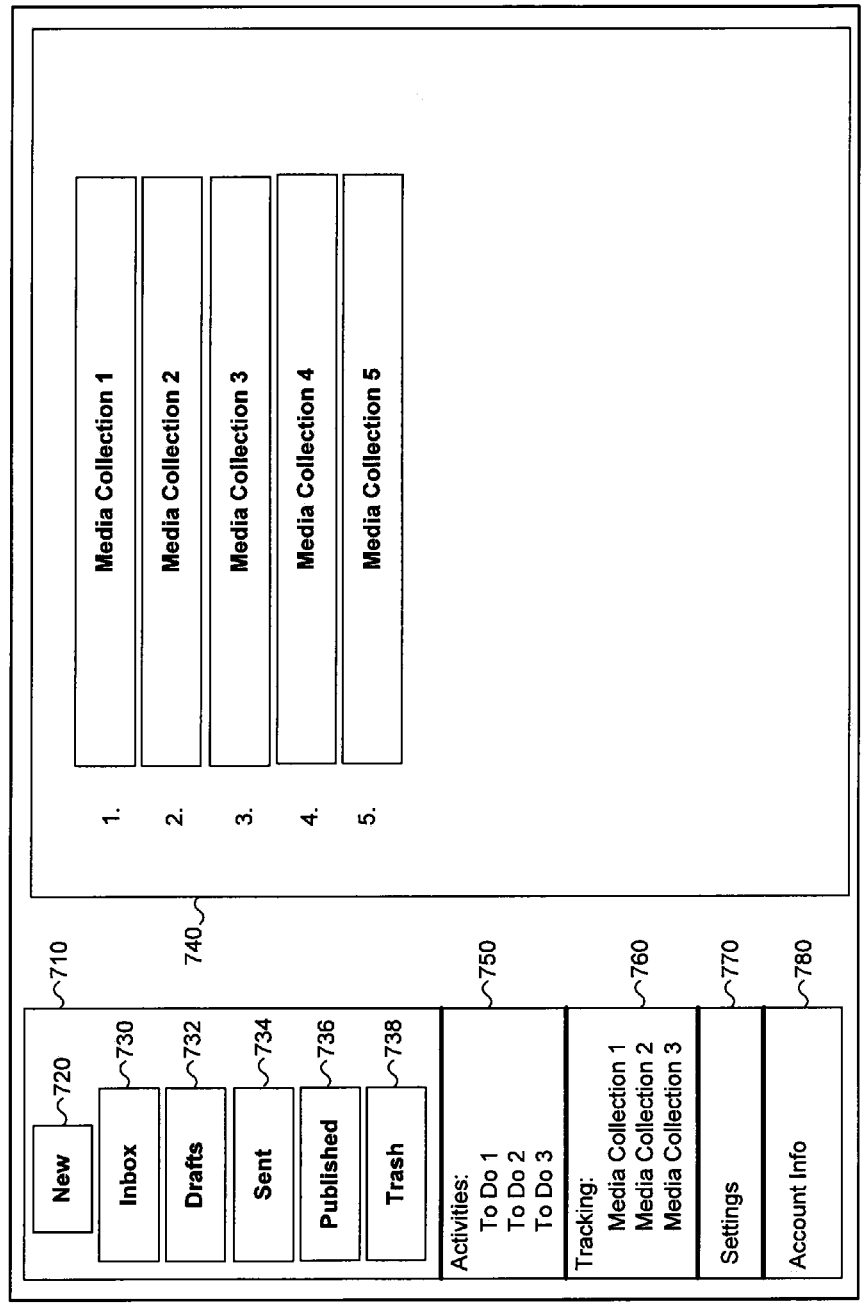
FIG. 7 is a block diagram illustrating a mixed-media collection manager facility according to embodiments of the invention.

FIG. 7 illustrates a management window 710 that allows the user to manage mixed-media collections, as well as a collection pane 740 listing the selected collections. The management window 710 is similar to an email box, but allows the user to perform various tasks on a collection of mixed-media collections that the user has received or moved into the user's collection. For instance, the user may create a new mixed-media collection by selecting the "new" button 720, which causes the compose/edit window 800 to appear as described below in FIG. 8A. Selecting an inbox button 730 causes a collection of mixed-media collections that the user has received to be displayed in the collection pane 740. Correspondingly, selecting a sent or published buttons 734, 736 causes the collection pane 740 to list those mixed-media collections that have been sent or published by the user, respectively.

Selecting a draft button 732 brings up a list of mixed-media collections that have been started, and saved, but for some reason are incomplete and have not yet been sent or published. A trash button 738 causes the collection pane 740 to generate a list of previously mixed-media collections. Pressing any of the buttons 730, 732, 734, 736, or 738 causes the collection pane 740 to generate a list of mixed-media collections that match the selected criteria. Then, one of the mixed-media collections can be selected from the list of files and a desired action performed. If the user wishes to play the mixed-media collection, selecting a play option brings up a play window (not pictured) where the collection can be viewed. During viewing, mixed-media collections transition between media types, such as video, screen, text, audio, data visualization, seamlessly and on-demand. Additionally, the mixed-media collections may include internal hyperlinks to internal indexes that allow a viewer to select any link during play that immediately begins playing from the selected index. Playback may be in a specialized viewing program that operates on a host device, such as a desktop or laptop computer, or on a mobile device, or could be played back through a web-browser, also operating on the host or mobile device. If instead the user wishes to modify the mixed-media collection, the user can cause the collection to open in an edit or modification mode, which is illustrated in FIG. 8B below.

Also illustrated in FIG. 7 are additional tools that may be specific to the selected mixed-media collection, or specific to the user. An activity tool 750 allows the user to manage activities associated with the mixed-media collection, such as "to dos," described above. When "to dos" are inserted into a mixed-media collection, a corresponding entry is added in the activity tool 750. During playback of the collection, a user can select that the "to do" has been satisfied, or the original author of the collection can determine whether the "to do" has been completed. Also, as addressed above, some of the activities inserted into the mixed-media collections can be automatically satisfied, such as, for instance, a user simply passing a particular point in the playback of the collection. During playback, a "to do" may appear at any time within the playback timeline. Any action, rider, data rider, or metadata may cause an action such as a "to do" to be generated and/or appear. The recipient may take action, such as checking a box indicating that the "to do" was satisfied. Playback may be held until such feedback is completed. The list of "to dos" and other actions are held in a database or other record that allows the creator, or others, to ensure the action was completed, or otherwise manage the actions.

A tracking tool 760 reports data about the selected mixed-media collection. The tracking tool 760 can, for example, report to the user how many times the collection has been completely viewed. Additionally, the tracking tool can report how many times the collection has been partially viewed if, for instance, users watch a particular part or series of clips within the collection. Other feedback data may be tracked here and reported to the user as well. In some embodiments a playback timeline bar, which indicates to the user where the playback is relative to the start and end of a clip or mixed-media collection may include its own information about mixed-media collection. For example, if a particular clip or portion of clip is repeated often in playback, the timeline bar may change color in that area to reflect its popularity. In one embodiment the timeline bar begins as blue, and as more users skip to or watch a particular section, the popular section is changed to red, the brilliance or brightness of which is indicative of how often, relatively, it has been viewed.

A settings tool 770 allows the user to insert preferences into one or all clips created by the user. For instance, the user may instruct that all mixed-media collections include a particular "signature" clip, such as including a "business card" at the end of each clip he or she creates. An account tool 780 allows the user to enter information and settings about his or her account with a central repository. For example, a public encryption key can be stored here, which the mixed-media collection may use to encrypt or decrypt a collection.

Figure 8A:
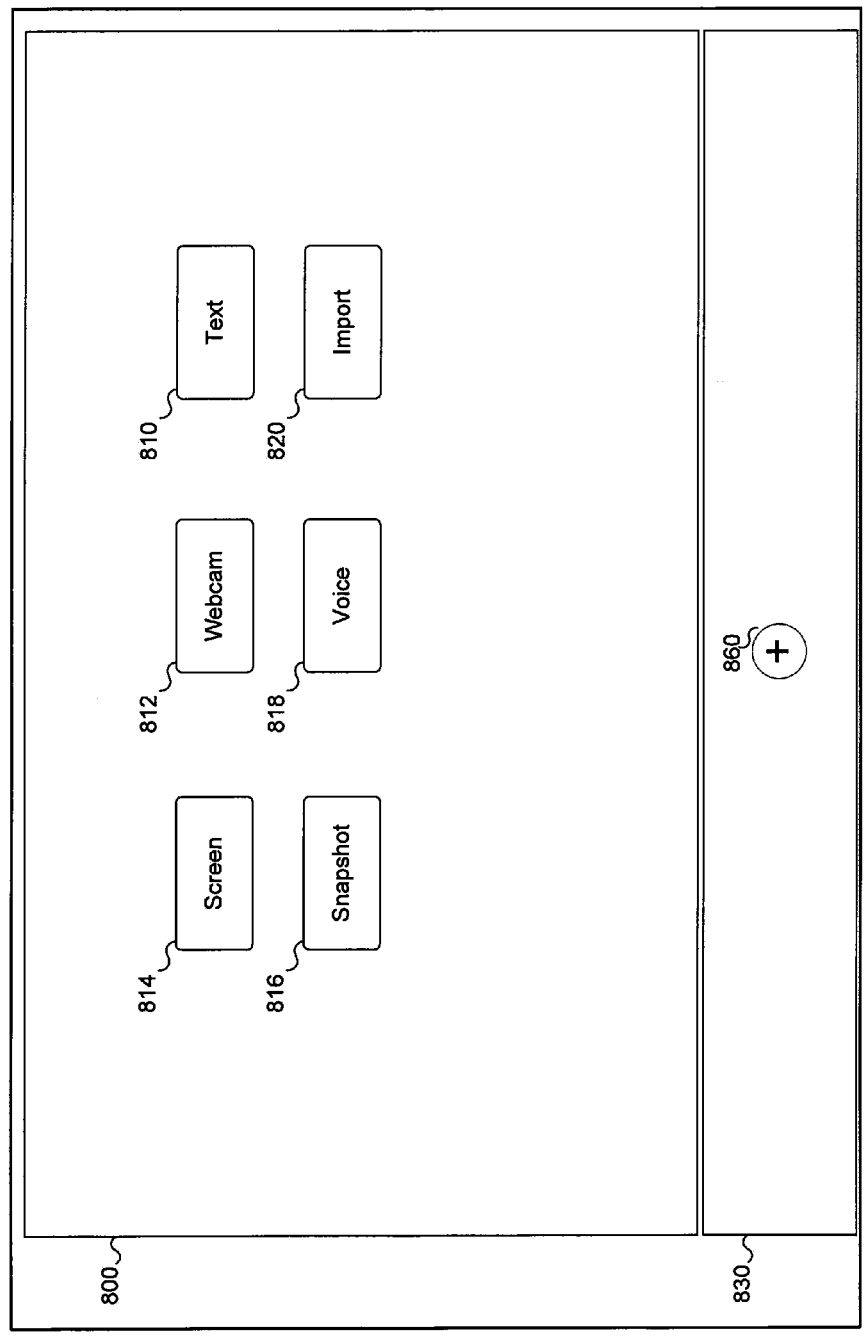
FIG. 8A is a block diagram illustrating a mixed-media collection compose/edit facility in a create mode according to embodiments of the invention.
Figure 8B:
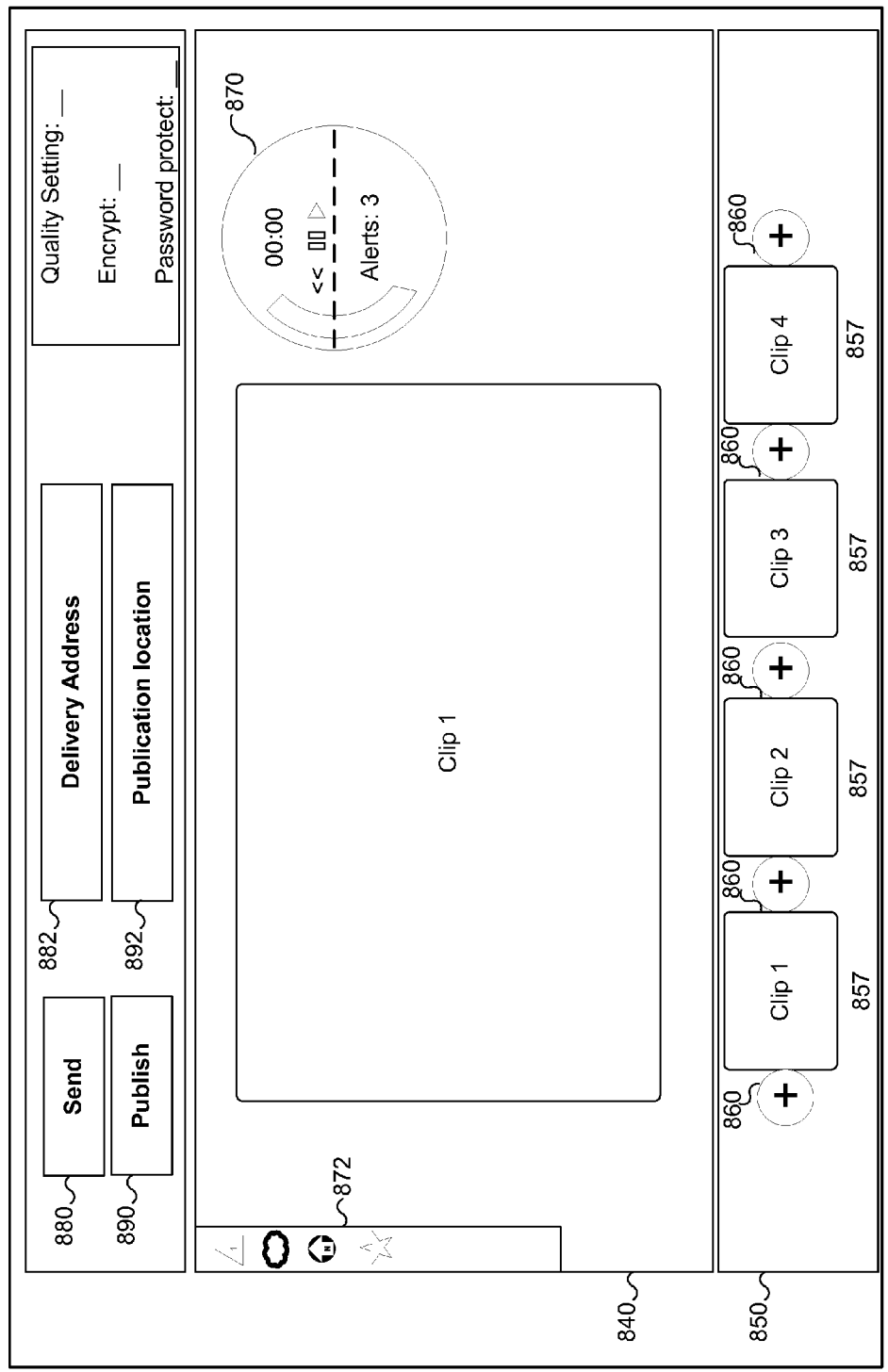
FIG. 8B is a block diagram illustrating a mixed-media collection compose/edit facility in an edit mode according to embodiments of the invention.

FIG. 8A illustrates a compose/edit window in a "new" mode, which is the state entered when the open button 310 of FIG. 3 or the new button 720 of FIG. 7 is selected. The compose/edit window 800 allows the user to create new mixed-media collections or modify collections that the user has received. A main pane 800 includes the same or similar tools to those described with reference to FIG. 3 above, and will not be repeated here. When the user selects one of the tools, the corresponding data, such as screen data when the screen icon 814 is selected, appears within the compose/edit window in a "create or modify" mode, illustrated as pane 840 in FIG. 8B. When the first selection is completed and another tool is selected, the data stored from the first tool becomes identified as a "clip," which appears in a clip pane 850, as illustrated in FIG. 8B. After a new mixed-media collection includes at least one clip, the compose/edit window 840 appears as it does in FIG. 8B. In that figure, the particular media collection is identified, and the various clips 857, in this example labeled "Clip 1," "Clip 2," "Clip 3," and "Clip 4," appear in the clip pane 850.

A user can add additional clips at any point of the timeline of the mixed-media collection by pressing an appropriate add/insert button 860. Pressing the add/insert button 860 at the extreme left edge of the clip pane 850 inserts a new clip before the other clips 857. Similarly, pressing the add/insert button 860 at the extreme right edge of the clip pane 850 inserts a new clip at the end of all the current clips 857. After pressing the add/insert button 860 the user can select which type of clip the user would like to add, such as by using a tool wheel 870, tool bar 872, or other selection. Additional editing functions can include splitting a particular clip into two or more pieces, inserting any type of media file within a clip, dragging files to be attached to the mixed-media message into the compose/edit window 800 or editing tool wheel 870, among other edits. It should be clarified that attaching files to a mixed-media collection is a different action than adding a clip or segment. Specifically, attached files are available to the viewer of the mixed-media collection at anytime, and are not necessarily tied to a particular portion of the timeline of the collection. After the mixed-media collection is created and edited (if desired), a user may send the collection to a targeted address or publish collection. To send the mixed-media collection, a user enters a desired email address or addresses in an address box 882, then selects the Send button 880. Similarly, to publish a collection, generally, and not to a specific recipient, the user enters the publication location in a location box 892, such as a website, or web hosted account, then selects the publish button 890. Before sending, the user may make selections in a settings box 896, in which the user can select a quality setting, set a password, and/or set an encryption mode for the mixed-media collection.

At any time, before or after a mixed-media collection is shared or sent, content or other data may be "overlayed" on the collection of clips. This content is termed a "rider" and can be made of any type of data, such as visual data, character data, numerical data, or even logic-driven condition. A mixed-media collection rider module can be used to create, alter, or remove each rider and associate it with the corresponding mixed-media collection. A rider as used herein generally refers to a collection of data that may be stored at a particular point in the timeline of a mixed-media collection, or may be generally stored as part of the collection without reference to time. Attached files may, in fact be a special type of rider in that it has a "file attachment" type. Attached files may appear in a special location, such as an "attached file" box within a playback window. In other modes, the attached files may appear at particular points in the timeline, and may be visible to the user for a given period of time, although they are available to the user by navigating to a particular "attached file" location. Riders may also differ from metadata, in that riders may be attached to a particular portion of a playback window. A rider can be a website reference, video, text, sound, audio track or graphic overlay, for example.

Multiple riders may be generated, added to a mixed-media collection, and stored with the mixed-media collection, and the number of riders can grow as more users add content to a collection. In some embodiments, various soundtracks to the mixed-media collection can exist as individual riders where selecting on a particular icon selects the desired playback soundtrack, for example a Spanish soundtrack. During playback of a collection, the rider(s) may be presented for only a portion of the playback or for the entire playback period. In some embodiments, a rider may be presented only when a corresponding data type or content is displayed. Alternatively or in addition, the rider may continue to be presented after the playback has finished, e.g., until closed by the viewer. Also, the format or visual display of the rider may change during playback. For example, if the viewer interacts with the rider during playback, the rider may change color to indicate that the rider has been accessed.

In some embodiments riders can form a "conversation," with a first included by a recipient posted as a question at a particular point in the playback timeline of the mixed-media collection. When the creator re-watches the collection, after the rider has been added, the creator may answer the question as a second rider, which is related to the first rider. That may spawn a third rider by another user, which could be answered by yet another user attaching a video clip as a fourth rider. At that point the mixed-media collection would include four separate riders, from four separate users, all of which are a part of the collection. Mixed-media collections can include dozens or hundreds of separate riders. Riders may be visible to one or more users or may never appear on the screen. For example, a rider may be set up to perform an action, such as capturing the time a particular section of a mixed-media collection was watched, or to detect whether the user skipped ahead in a timeline rather than watching the collection all the way through. In such a case, upon playback, the rider captures the requested data and sends it back to the creator, or whatever action was requested in the rider.

Riders may be "stacked" in the order in which they were attached to the multi-media collection, or may be stacked in "logical" order. For example, if a first user adds 10 riders at various points in a mixed-media collection, an $11^{th}$ rider, from a second user, may be stored along with the point in the timeline to which it refers, rather than after all of the 10 riders from the first user.

Figure 9:
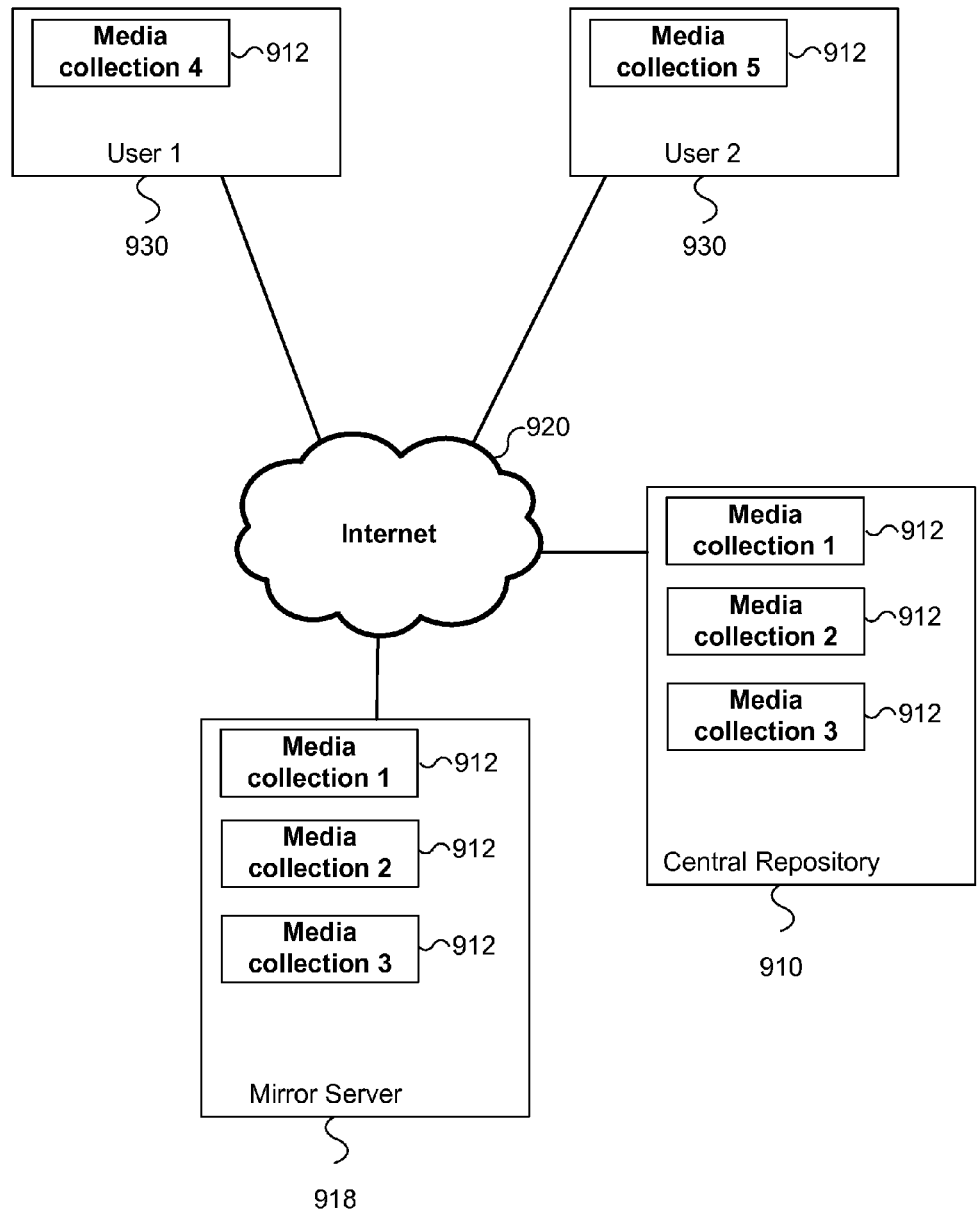
FIG. 9 is a functional block diagram illustrating how mixed-media collections may be accessed by multiple users.

FIG. 9 illustrates how users access the mixed-media collections after they are created. A mixed-media collection repository 910 includes one or more individual mixed-media collections 912. These mixed-media collections may be simple collections with few components, or extremely sophisticated collections with multiple components, such as various video clips, audio clips, metadata, URL links, animations, etc. The repository 910 is coupled to a network, such as the internet 920. Each of the mixed-media collections 912 has an individual URL address or addresses that identifies the particular collection. In some instances a collection begins with a single URL, but each time a subsequent user modifies the collection, the collection is identified with another URL. Thus, it is possible that some mixed-media collections "fork" and various versions simultaneously exist. A mirror 918 may include copies of the mixed-media collections or individual components of the collections for faster access to particular users. The mirror 918 may be updated as mixed-media collections are created, edited, modified and/or deleted in real-time through a seamless background process as is known in the art. Users 930 access the mixed-media collections by selecting the proper individual link through whatever appliance connects them to the internet 920, such as a computer or internet connected mobile device. Once selected, a copy of the particular mixed-media collection is loaded or streamed onto the user's device. The loading or streaming may begin in the middle of a collection 912, and need not necessarily begin at the start of the collection. Once available to the user, the user may simply play a mixed-media collection, or interact with it as described above. In some cases users may additionally have a local copy of a mixed-media collection that is local only to the particular user. This may occur when the mixed-media collection is in the process of being created, or is fully created but not yet published or sent. In other cases, the mixed-media collections may be stored in the repository 910 regardless of whether they have yet been published. Mixed-media collections 912 or components of them may be temporarily or permanently stored on any machine or mobile device capable of storing them. For example, a user may keep a copy of every mixed-media collection that the user creates. In server environments, the server may store a copy of every, or selected mixed-media collection that any user connected to the server creates or receives.

Figure 10:
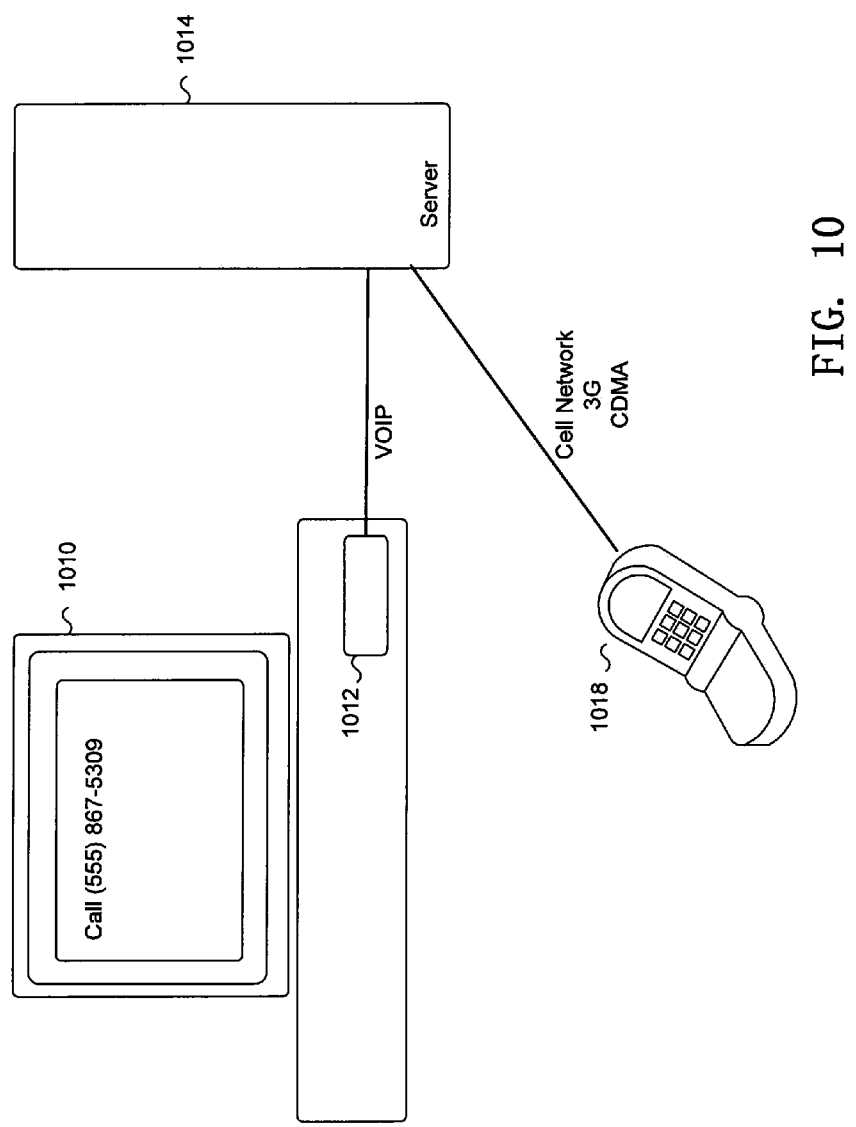
FIG. 10 is a block diagram illustrating a system to couple a secondary device to a host computer for mixed-media collection creation, editing or playback.

FIG. 10 illustrates a particular embodiment to use audio features of a secondary device if either a speaker or microphone, or both, is not available on a computer on which a mixed-media collection is created or modified. In many embodiments, including an audio soundtrack is an important part of creating a mixed-media collection. Because many people now have a cell phone with them at all times, this embodiment allows the microphone and speaker of a cell phone to be used in creating, editing, or replaying a mixed-media collection in conjunction with a host computer or device.

As illustrated in FIG. 10, a computer 1010 hosts the hardware and software to create the mixed-media collections. The computer 1010 further includes a virtual audio card 1012 that creates signals to communicate with a bridge server 1014. The bridge server 1014 in turn connects to or couples with the communication device, such as a cell phone or other communication device 1018. Proprietary or open protocols may be used to connect the virtual audio card 1012 to the server 1014 and the same or different proprietary or open protocols may connect the server 1014 to the cell phone 1018. In an operation in which a user wishes to use the audio components of the cell phone 1018, the user establishes connection to the cell phone 1018 during the operation. Instead of the user speaking directly into a microphone coupled to the computer 1010, the user instead speaks into his or her cell phone 1018. The audio signals are then transmitted from the cell phone 1018 through the server 1014 through the virtual audio card 1012 and stored as audio data within the mixed-media collections. Conversely, when the mixed-media collection is played back, the audio signals from the collection are sent through the virtual audio card 1012 through the server 1014 to the recipient's cell phone 1018. A user communication box 1020 may be selected to pop up on the screen 100 of the host computer (or cell phone 1018), or be present during the media collection playback. For instance, a particular notice may be posted giving a call in number and identification code that identifies the particular mixed-media collection. Alternatively, the user can enter a phone number, and optional extension, which will place an outbound call to the phone number to instantiate the communication bridge.

In application, the server 1014 may be any mechanism that communicates the data between the computer 1010 and the communication device 1018. For instance, the server 1014 may be a Bluetooth communication device, and communicates with a built-in Bluetooth receiver in the cell phone 1018.

There may be a communication time delay between the computer 1010, where video data is being stored, and, for instance, audio data from a cell phone 1018. To accommodate for the potential time delay, a time synchronization facility allows the user to align the data from the communication device 1018 with the video as it is being recorded. In one example a software control box with an alignment slider is presented. Moving the slider modifies a time differential between the audio and video such that any communication delay can be eliminated and the video and audio recorded at the same time or with the same time references. Although it is less likely, the time synchronization facility may also be used even where audio is received from a built-in microphone, such as the microphone 540 of FIG. 5.

Other embodiments of the same inventive concept include connecting the device that is creating, modifying or playing the mixed-media collection, such as a host computer, to any other device through any communication bridge.

Although there has been described to this point particular embodiments of a system to record, distribute, playback, and modify mixed-media collections, it is not intended that such specific references be considered as limitations upon the scope of this invention except in-so-far as set forth in the following claims.

The invention claimed is:

1. A system for managing collections having at least one content type, comprising:
    a screen data capture module configured to capture video data in a window presented to a user on a video display device, the window having a window privacy setting associated therewith that specifies a particular action for the managing module to take responsive to a determination that at least one of the plurality of windows has a particular window type;
    a mixed-media collection managing module configured to create and manage a mixed-media collection (MMC) that incorporates the captured video data, the managing module being further configured to alter at least some of the captured video data based at least in part on the window privacy setting; and
    an MMC storage module configured to store the MMC.

2. The system according to claim 1 in which the window privacy setting further comprises at least one of a user profile and a group profile.

3. The system according to claim 1 in which the managing module is further configured to blur at least some of the captured screen data based on the window privacy setting, and in which the MMC storage module is further configured to store the blurred captured screen data.

4. The system according to claim 3 in which the managing module is further configured to apply encryption to at least some of the stored blurred captured screen data.

5. The system according to claim 3 in which the managing module is further configured to retrieve and play back at least some of the blurred captured screen data after the blurred captured screen data has been stored by the MMC storage module.

6. The system according to claim 5 in which the managing module is further configured to restore to an original state at least some of the blurred captured screen data responsive to proper user authentication.

7. The system according to claim 1 in which the managing module is further configured to black out at least some of the captured screen data based on the window privacy setting, and in which the MMC storage module is further configured to store the blacked out captured screen data.

8. The system according to claim 7 in which the managing module is further configured to apply encryption to at least some of the stored blacked out captured screen data.

9. The system according to claim 7 in which the managing module is further configured to retrieve and play back at least some of the blacked out captured screen data after the blacked out captured screen data has been stored by the MMC storage module.

10. The system according to claim 9 in which the managing module is further configured to restore to an original state out at least some of the blacked out captured screen data responsive to proper user authentication.

11. The system according to claim 1 in which the managing module is further configured to select at least some of the captured screen data based on the window privacy setting, and in which the MMC storage module is further configured to store the captured screen data and not the non-selected screen data.

12. The system according to claim 11 in which the managing module is further configured to retrieve and play back at least some of the captured screen data after the captured screen data has been stored by the MMC storage module.

13. The system according to claim 1 in which the MMC managing module is further configured to retrieve the stored MMC and to provide at least some of the retrieved MMC to an output display device.

14. The system according to claim 1, in which the MMC managing module is further configured to blur at least some of the retrieved MMC based on the window privacy setting before providing it to the output display device.

15. The system according to claim 1, in which the MMC managing module is further configured to black out at least some of the retrieved MMC based on the window privacy setting before providing it to the output display device.

16. The system according to claim 1, in which the MMC managing module is further configured to omit at least some of the retrieved MMC based on the window privacy setting before providing it to the output display device.

17. A system for playing collections having at least one content type, comprising:
    a mixed-media collection (MMC) storage module configured to store an MMC comprising previously captured screen data that includes a window that was previously presented to a user on a display device, the previously presented window having a window privacy setting associated therewith that specifies a particular action for the managing module to take responsive to a determination that at least one of the plurality of windows has a particular window type; and
    an MMC playback module configured to allow a user to view playback data corresponding to the previously captured screen data, the MMC playback module being further configured to generate the playback data by altering at least some of the previously captured screen data based at least in part on the window privacy setting.

18. The system according to claim 17 in which the MMC playback module is further configured to generate the playback data by blurring at least some of the previously captured screen data based on the window privacy setting.

19. The system according to claim 17 in which the MMC playback module is further configured to generate the playback data after it has been stored by retrieving the previously captured screen data and blacking out at least some of the previously captured screen data based on the window privacy setting.

20. The system according to claim 17 in which the MMC playback module is further configured to generate the playback data by omitting from playback at least some of the previously captured screen data based on the window privacy setting.

21. The system according to claim 17 in which the previously captured screen data further includes another window that was simultaneously presented to the user on the display device at time of capture, in which the previously presented window was partially blocked by at least a portion of the other window, and in which the playback data includes the previously presented window and the other window.

22. A machine-controlled method, comprising:
- capturing screen data with a mixed-media collection (MMC) creation module that defines at least one window presented to a user via a display device;
- retrieving a window privacy setting associated with the at least one window, the window privacy setting specifying one of a plurality of actions that can be performed on screen data of the at least one window and the window privacy setting specifying a particular action for the MMC creating module to take responsive to a determination that at least one of the plurality of windows has a particular window type;
- creating an MMC with the MMC creation module and incorporating into the MMC at least some of the captured screen data;
- altering at least some of the captured screen data incorporated into the MMC based at least in part on the window privacy setting; and
- an MMC storage module storing the MMC on at least one of a user machine and a remote storage device.

23. The machine-controlled method according to claim 22, in which altering at least some of the captured screen data occurs before the MMC storage module stores the altered MMC.

24. The machine-controlled method according to claim 22 further comprising an MMC playback module allowing another user to play back at least part of the MMC, the MMC playback module performing the altering before allowing the other user to play back at least part of the MMC.

25. One or more tangible, machine-readable media storing machine-executable instructions that, when executed by a machine, cause the machine to perform the machine-controlled method according to claim 22.

* * * * *